(12) United States Patent
Bahl et al.

(10) Patent No.: US 7,016,705 B2
(45) Date of Patent: Mar. 21, 2006

(54) REDUCING POWER CONSUMPTION IN A NETWORKED BATTERY-OPERATED DEVICE USING SENSORS

(75) Inventors: Paramvir Bahl, Sammamish, WA (US); Eugene Shih, Seattle, WA (US); Michael J. Sinclair, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 463 days.

(21) Appl. No.: 10/124,720

(22) Filed: Apr. 17, 2002

(65) Prior Publication Data

US 2003/0197597 A1 Oct. 23, 2003

(51) Int. Cl.
H04B 1/38 (2006.01)
H04M 1/00 (2006.01)
(52) U.S. Cl. .................. 455/566; 455/567; 455/574
(58) Field of Classification Search ........... 455/574, 455/566, 567, 343.1; 345/156
See application file for complete search history.

(56) References Cited

U.S. PATENT DOCUMENTS

| | | | | |
|---|---|---|---|---|
| 5,586,182 A * | 12/1996 | Miyashita | ................. | 379/413 |
| 5,850,181 A | 12/1998 | Heinrich et al. | | |
| 5,881,377 A * | 3/1999 | Giel et al. | ............... | 455/343.1 |
| 5,953,677 A * | 9/1999 | Sato | ............... | 455/574 |
| 6,141,568 A * | 10/2000 | Sakaguchi | ................. | 455/566 |
| 6,801,794 B1 * | 10/2004 | Bauer | ........................ | 455/574 |
| 6,807,165 B1 | 10/2004 | Belcea | | |
| 2002/0021278 A1 * | 2/2002 | Hinckley et al. | ............. | 345/156 |
| 2002/0142792 A1 * | 10/2002 | Martinez | ................... | 455/550 |
| 2003/0203740 A1 | 10/2003 | Bahl et al. | | |
| 2004/0029546 A1 * | 2/2004 | Tsuchi et al. | ............. | 455/159.1 |
| 2004/0179469 A1 | 9/2004 | Attar et al. | | |
| 2004/0181569 A1 | 9/2004 | Attar et al. | | |
| 2005/0003793 A1 * | 1/2005 | Goris et al. | ................. | 455/347 |

FOREIGN PATENT DOCUMENTS

JP    07303077 A   * 11/1995

OTHER PUBLICATIONS

Albrecht Schmidt, Advanced Interaction in Context, 1999.*
"Specification of the Bluetooth System", vol. 1, Dec. 1, 1999, (1,082 pages).
Miller, Brent, et al., "Mapping Salutation Architecture APIs to Bluetooth Service Discovery Layer" (White Paper); vol. 1.0, IBM Corporation, Jul. 1, 1999, (pp. 1-26).
IEEE Standard, 802.11, Part 11: Wireless LAN Medium Access Control (MAC) and Physical Layer (PHY) Specifications, 1st Edition 1999 (512 pages).
O'Hara, Bob, et al., IEEE 802.11 Handbook A Designer's Companion, Dec. 1999, (174 pages).
Rigney, C., et al., "Remote Authentication Dial in User Service (Radius)", The Internet Society, Jun. 2000, (pp. 1-59).

(Continued)

Primary Examiner—Nguyen T. Vo
(74) Attorney, Agent, or Firm—Wolf, Greenfield & Sacks, P.C.

(57) ABSTRACT

A method and system for mobile device power consumption management decreases the instantaneous power consumption of a mobile device, increasing operational lifetime of the device. In an embodiment of the invention, the mobile device is associated with a plurality of device behavior modification techniques that can be set in response to data collected from a plurality of sensors associated with the device. In an embodiment, the sensors detect the device's motion, tilt, proximity to a user, contact with a user, and orientation with respect to a user. In a further embodiment, the sensors detect a temperature related to the device or its environment.

2 Claims, 5 Drawing Sheets

| | MOVING | IN USER POCKET | USER LOOKING AT | USER CLOSE | DEVICE POWER CONSUMPTION MODIFICATIONS |
|---|---|---|---|---|---|
| 411 | 0 | 0 | 0 | 0 | Low power standby, high ringer, no vibrator, no screen, decreased update rate |
| 413 | 0 | 0 | 0 | 1 | Low power standby, low ringer, no vibrator, no screen, decreased update rate |
| 415 | 0 | 0 | 1 | 0 | NA |
| 417 | 0 | 0 | 1 | 1 | Normal power standby, no ringer, no vibrator, screen normal, decreased update rate |
| 419 | 0 | 1 | 0 | 0 | NA |
| 421 | 0 | 1 | 0 | 1 | Normal power standby, no ringer, yes vibrator, no screen, decreased update rate |
| 423 | 0 | 1 | 1 | 0 | NA |
| 425 | 0 | 1 | 1 | 1 | NA |
| 427 | 1 | 0 | 0 | 0 | (unlikely) Low power standby, high ringer, no vibrator, no screen, normal update rate |
| 429 | 1 | 0 | 0 | 1 | Normal power standby, low ringer, no vibrator, no screen, normal update rate |
| 431 | 1 | 0 | 1 | 0 | NA |
| 433 | 1 | 0 | 1 | 1 | Normal power standby, no ringer, no vibrator, screen normal, normal update rate |
| 435 | 1 | 1 | 0 | 0 | NA |
| 437 | 1 | 1 | 0 | 1 | Normal power standby, no ringer, yes vibrator, no screen, normal update rate |
| 439 | 1 | 1 | 1 | 0 | NA |
| 441 | 1 | 1 | 1 | 1 | NA |

OTHER PUBLICATIONS

Aboda, B., et al., *RFC 2716, "PPP EAP TLS Authentication Protocol"*. The Internet Society, Oct. 1999, (pp. 1-19).

Blunk, L., et al., RFC 2284, *PPP Extensible Authentication Protocol (EAP)*, The Internet Society, Mar. 15, 2000, (pp. 1-12).

*IEEE 802.11 Security White Paper*, vol. 1., Windows Network Infrastructure team, Microsoft Corporation, Mar. 15, 2000, (23 pages).

*IEEE 802.1X Supported Scenarios*, Windows Network Infrastructure team, Microsoft Corporation, vol. 1, Apr. 7, 2000, (7 pages).

Mettala, Riku, et al., *"Bluetooth Protocol Architecture"* (White paper), vol. 1.0, Nokia Mobile Phones, Sep. 29, 1999.

Guo et al., "Low power distributed MAC for ad hoc sensor radio networks," Proceedings of IEEE Global Telecommunications Conference (GLOBECOM '01), vol. 5, Nov. 25-29, 2001, retrieved from http://bwrc.eecs.berkeley.edu/People/Faculty/jan/publications/p137.pdf, on Feb. 3, 2005.

INTEL, "Sample Installation Scenarios," Intel Wireless Gateway, pp. 1-3 (Oct. 9, 2001), retrieved from http://support.intel.com/support/wireless/wlan/gateway/sb/CS-008078.htm, on Feb. 3, 2005.

Benini, Luca, et al., "Monitoring System Activity for OS-Directed Dynamic Power Management", *In Proceedings of 1998 ACM ISLPED*, pp. 185-190.

Benini, Luca, et al., "Dynamic Power Management of Electronics Systems", in *Proceedings of the 1998 IEEE/ACM ICCAD*, Nov. 8-12, 1998, San Jose CA, pp. 696-702.

Hinckley, K., et al., "Sensing Techniques for Mobile Interaction", *ACM UIST 2000 Symposium on User Interface Software & Technology*, CHI Letters 2 (2), pp. 91-10.

*Intel Microsoft Toshiba*, "Advanced Configuration and Power Interface", Revision 1.0, Feb. 2, 1999, 323 pages.

Simunic, Tajana, et al., "Dynamic Power Management for Portable Systems", *In Proceedings of ACM MOBICOM 2000*, Aug. 2000, Boston, MA pp. 11-20.

Simunic, Tajana, et al., "Dynamic Voltage Scaling and Power Management for Portable Systems", *In Proceedings of ACM DAC 2001*, Aug. 2001, pp. 524-529.

Fleishman, Glenn, New Wireless Standards Challenge 802.11b, The O'Reilly Network, at http://www.oreillynet.com/lpt/a//wireless_/2001/05/08/standards.html (Jun. 8, 2001), pp. 1-4.

Flickenger, Rob, 802.11B Tips, Tricks and Facts, The O'Reilly Network, retrieved from http://www.oreillynet.com/lpt/a//wireless/2001/03/802.11b_facts_.html (Mar. 2, 2001), pp. 1-3.

Press Release, "Atheros Communications, Atheros Ships Combo Rolling Three WLAN Standards into a Single Solution", retrieved from www.atheros.com/news/combo.html (Mar. 11, 2002) pp. 1-3.

Atheros Communications, AR5001X Combo WLAN Solution Brochure, retrieved from www.atheros.com pp. 1-2.

Nobel, Carmel, For WLAN, It's 802.11bm Eweek from www.eweek.com/print_article_/0.3668.a=18648.00.asp (Nov. 19, 2001) pp. 1-2.

Nandagopal, T., et al., "A Unified Architecture for the Design and Evaluation of Wireless Fair Queueing Algorithms", ACM MobiCom 1999, in proceedings of *The Fifth Annual ACM/IEE International Conference on Mobile Computing and Networking* (Aug. 1999) pp. 132-173.

Keshav, S., "On the Efficient Implementation of Fair Queueing" *Internetworking, Research and Experience*, vol. 2, No. 3., 157-173 (1991).

Bharghavan, V., et al., "Fair Queuing in Wireless Networks: Issues and Approaches", *IEEE Personal Communications Magazine*, pp. 44-53 (Feb. 1999).

Parekh, A.K., et al., "A Generalized Processor Sharing Approach to Flow Control in Integrated Services Networks: The Single-Node Case", *IEEE/ACM Transactions on Networking*, vol. 1, No. 3, pp. 344-357 (Jun. 1993).

Parekh, A.K., et al., "A Generalized Processor Sharing Approach to Flow Control in Integrated Services Networks: The Multiple Node Case", *IEEE/ACM Tranactions on Networking*, vol. 1, No. 2, pp. 137-150 (Mar. 1994).

NG, T.S., "Packet Fair Queueing: Algorithms for Wireless Networks with Location-Dependent Errors", *Proceedings of INFOCOM '98, The Conference on Computer Communications* vol. 3, *Seventh Annual Joint Conference of the IEEE Computer and Communications Societies*, pp. 1103-1111 (Mar. 1998).

Lettieri et al.; "Advances in Wireless Terminals," *IEEE Personal Communications*, vol. 6, No. 1, (Feb. 1999), pp. 6-19.

Yung-Hsiang Lu et al.; "Requester-Aware Power Reduction," *IEEE*; Sep. 20, 2000, PP. 18-23.

Benini et al.; "System-level Dynamic Power Management," Low-Power Design, 1999; Proceedings. IEEE Alessandro Volta Memorial Workshop On Como, Italy Mar. 4-5, 1999, Los Alamitos, CA, USA, *IEEE Comput. Soc*, US, pp. 23-31.

Liu, Jun, et al., "Using Loss Pairs to Discover Network Properties", *ACM SIGCOM Internet Measurement Workshop*, 2001, 12 pages.

Zhang, Yin, et al., "On the Constancy of the Internet Path Properties", *SIGCOM Internet Measurement Workshop*, 2001, 15 pages.

Lai, Kevin, et al., "Measuring Link Bandwidths Using A Deterministic Model of Packet Delay", *In Proceedings of ACM SIGCOM 2000*, 12 pages.

Balakrishnan, Hari, et al., "Analyzing Stability in Wide-Area Network Performance", *In Proceedings of CAN SIGMETRICS Conference on Measurement & Modeling of Computer Systems*, Seattle, WA Jun. 1997, 11 pages.

Yavatkar, R., et al., "SBM (Subnet Bandwidth Manager): A Protocol for RSVP-based Admission Control Over IEEE 802-style Networks", *IETF RFC 2814*, retrieved from http://www.faws.org/rfcs/rfc2814.html on May 19, 2002.

Breslau, Lee, et al., "Endpoint Admission Control: Architectural Issues and Performance", *In Proceedings of ACM SIGCOMM 2000*, pp. 57-69.

Chiasserini, Carla, F., "Combining Paging with Dynamic Power Management", in *IEEE INFOCOM 2001*, pp. 996-1004.

Shih, Eugene, et al., "Wake on Wireless: An Event Driven Energy Saving Strategy for Battery Operated Devices", MOBICOM '02, Sep. 23-26, 2002, pp. 1-12.

Kleynhans, Steve, *"IBM: Back in the PC Game"*, retrieved from http://www.techupdate.zdnet.com/techupdate/stories/main/0,14179,2868907-2,00html (last visited Sep. 16, 2002).

*"Wayports Successful Trail of Microsoft Windows XP and 802,1x Forecasts a More Secure Environment for Wireless Users"*, HITCH Online 2002 edition at http://online.hitec.org/news/4009856,20000343.htm (last visited Sep. 16, 2002).

"Wireless LAN Computing with IBM Personal Device", *IBM White papers*, IBM Personal Systems Group, Dec. 2001, 9 pages.

Bowman, Barb, *"Unplugged and Unwired", Microsoft Corporation* at http://www.microsoft.com/windowsxp/expertzone/columns/bowman/june11.asp (last visited Sep. 16, 2002).

"Windows XP Segment Analysis of the IBM ThinkPad Notebook Platform", *Strategic Relationship Marketing* Oct. 2001, 1 page.

*Boingo Launches Nationwide WI-FI Service*, Boingo Press Releases at http://www.boingo.com/pr/pr3/html (last visited Sep. 20, 2002).

*Boingo Wireless Announces Founding and Funding*, Boingo Press Releases at http://www.boingo.com/pr/pr1/html (last visited Sep. 20, 2002).

*802.11b has reached 'escape Velocity* Boingo Wireless Market Overview at http://www.boingo.com/marketoverview.html (last visited Sep. 20, 2002).

Chan, Sharon Pian, *Wireless where you want: WI-Fi is the guerrilla revolution of wireless computing, Seattle Times Wireless where you want it* at http://www.seattletimes.nwsource.com/htm/businesstechnology/134402814 wireless11.html last visited Sep. 20, 2002).

*Wireless Technology, Wireless Technology* at http/www.microsoft.com/hwdev/wireless (last visited Dec. 8, 2000).

Lough, Daniel, L., et al., *A Short Tutorial on Wireless LANs and IEEE 802.11* at http://www.computer.org/students/looking/summer97/ieee8702.htm (last visited Dec. 12, 2000), 5 pages.

Mubashir, Alam, *Descriptive Analysis of IEEE 802.11 Standard for Wireless Networks*, at http://www.triton.cc.gatech.edu/ubicomp.257 (last visited Dec. 12, 2000).

*Zero Configuration Networking* (*zeroconf*) at http://www.zeroconf.org (last visited Dec. 12, 2000).

Cheshire, Stuart, *"Dynamic Configuration of IPv4 Link-local Addresses"*, Apple Computer Oct. 8, 2000 at http://www.zeroconf.org/draft-ietf-zeroconf-ipv4-linklocal-00.txt (last visited Dec. 12, 2000).

Hattig, M., *Zeroconf Requirements draft-ietf-zeroconf-reqts-06.txt* (last visited Dec. 12, 2002).

"Enabling IEEE 802.11 Networks with Windows "Whistler"", at http://www.microsoft.com/hwdev/wireless/ieee802Net.htm (last visited Dec. 8, 2000).

"Specification of the Bluetooth System", vol. 1, Dec. 1, 1999, (1,082 pages).

Miller, Brent, et al., *"Mapping Salutation Architecture APIs to Bluetooth Service Discovery Layer"* (White Paper), vol. 1.0, IBM Corporation, Jul. 1, 1999, (pp. 1-26).

*IEEE Standard, 802.11, Part 11: Wireless LAN Medium Access Control (MAC) and Physical Layer (PHY) Specifications*, 1st Edition 1999 (512 pages).

O'Hara, Bob, et al., *IEEE 802.11 Handbook A Designer's Companion*, Dec. 1999, (174 pages).

Rigney, C., et al., *"Remote Authentication Dial in User Service (Radius)"*, The Internet Society, Jun. 2000, (pp. 1-59).

Aboda, B., et al., *"RFC 2716, PPP EAP TLS Authentication Protocol"*. The Internet Society, Oct. 1999, (pp. 1-19).

Blunk, L., et al., RFC 2284, *PPP Extensible Authentication Protocol (EAP)*, The Internet Society, Mar. 15, 2000, (pp. 1-12).

*IEEE 802.11 Security White Paper*, vol. 1., Windows Network Infrastructure team, Microsoft Corporation, Mar. 15, 2000, (23 pages).

*IEEE 802.1X Supported Scenarios*, Windows Network Infrastructure team, Microsoft Corporation, vol. 1, Apr. 7, 2000, (7 pages).

Mettala, Riku, et al., *"Bluetooth Protocol Architecture"* (White paper), vol. 1.0, Nokia Mobile Phones, Sep. 29, 1999.

Muller, T., *Bluetooth Security Architecture*, (White paper), vol. 1.0, Jul. 15, 1999.

* cited by examiner

| SENSOR | VALUE |
|---|---|
| Temperature Sensor | NA |
| Proximity Sensor | Close Proximity |
| Accelerometers | NA |
| Tilt Sensor | NA |
| Touch Sensor | No Touch |
| IR Ranging IR LED | Very Close in Front |

FIGURE 3b (in pocket)

| SENSOR | VALUE |
|---|---|
| Temperature Sensor | NA |
| Proximity Sensor | NA |
| Accelerometers | Highly Variable |
| Tilt Sensor | Highly Variable |
| Touch Sensor | NA |
| IR Ranging IR LED | NA |

FIGURE 3a (moving)

| SENSOR | VALUE |
|---|---|
| Temperature Sensor | NA |
| Proximity Sensor | Close Proximity |
| Accelerometers | NA |
| Tilt Sensor | NA |
| Touch Sensor | NA |
| IR Ranging IR LED | NA |

FIGURE 3d (user is close by)

| SENSOR | VALUE |
|---|---|
| Temperature Sensor | NA |
| Proximity Sensor | Close Proximity |
| Accelerometers | NA |
| Tilt Sensor | Device is Tilted |
| Touch Sensor | Device is Touched |
| IR Ranging IR LED | Close in Front |

FIGURE 3c (looking at)

| | MOVING | IN USER POCKET | USER LOOKING AT | USER CLOSE | DEVICE POWER CONSUMPTION MODIFICATIONS |
|---|---|---|---|---|---|
| 411 | 0 | 0 | 0 | 0 | Low power standby, high ringer, no vibrator, no screen, decreased update rate |
| 413 | 0 | 0 | 0 | 1 | Low power standby, low ringer, no vibrator, no screen, decreased update rate |
| 415 | 0 | 0 | 1 | 0 | NA |
| 417 | 0 | 0 | 1 | 1 | Normal power standby, no ringer, no vibrator, screen normal, decreased update rate |
| 419 | 0 | 1 | 0 | 0 | NA |
| 421 | 0 | 1 | 0 | 1 | Normal power standby, no ringer, yes vibrator, no screen, decreased update rate |
| 423 | 0 | 1 | 1 | 0 | NA |
| 425 | 0 | 1 | 1 | 1 | NA |
| 427 | 1 | 0 | 0 | 0 | (unlikely) Low power standby, high ringer, no vibrator, no screen, normal update rate |
| 429 | 1 | 0 | 0 | 1 | Normal power standby, low ringer, no vibrator, no screen, normal update rate |
| 431 | 1 | 0 | 1 | 0 | NA |
| 433 | 1 | 0 | 1 | 1 | Normal power standby, no ringer, no vibrator, screen normal, normal update rate |
| 435 | 1 | 1 | 0 | 0 | NA |
| 437 | 1 | 1 | 0 | 1 | Normal power standby, no ringer, yes vibrator, no screen, normal update rate |
| 439 | 1 | 1 | 1 | 0 | NA |
| 441 | 1 | 1 | 1 | 1 | NA |

FIGURE 4

REDUCING POWER CONSUMPTION IN A NETWORKED BATTERY-OPERATED DEVICE USING SENSORS

TECHNICAL FIELD OF THE INVENTION

The present invention relates generally to mobile computing devices, and more particularly, to power consumption reduction in a mobile computing device using sensors.

BACKGROUND OF THE INVENTION

With the advent of extreme miniaturization in electronic components, many new types of devices and activities have become possible and even prevalent. For example, the use of many types of mobile devices that use radio frequency signals for connectivity has become routine. One such device is a cell phone, and another is a personal information device, i.e. a handheld computing device that is usable for tasks such as scheduling appointments as well as tasks such as communicating over a network with another user having a similar or other device.

While mobile computing devices such as those mentioned above, as well as others, confer many benefits on their users, there are certain limitations imposed by such devices that are not experienced with non-mobile devices. For example, one dominant problem associated with mobile devices is the problem of operational lifetime between battery charges. As the user uses a device, the device power source, typically a battery, becomes depleted, eventually falling below a level required for operation of the device. At such time, the user must recharge or rejuvenate the power supply before continuing to use the device. This requirement for battery renewal can be problematic for several reasons. First, if the battery becomes depleted unexpectedly, the user may be greatly inconvenienced if he or she was relying on the device for some functionality, such as emergency calling etc. Additionally, even if the user is aware of the depletion and responds by beginning to charge the battery, the device will generally not be mobile and usable until after the charge cycle is complete, decreasing the overall general usefulness of the device.

Today's mobile devices often recognize the limited capacity of battery power sources by incorporating certain power-saving features. Such features include activating a screen or other user interface element only when the device is actively used by a user. For example, a cell phone may always be ready to receive an incoming call, but the device display screen may remain dark or blank until a user receives a call. Some personal information devices also incorporate features to activate the device only when it is being held and used. Furthermore, many mobile devices incorporate a power switch so that the device may be entirely powered down for a desired period. For example, a cell phone user may turn the phone completely off when no calls are expected to be made or received. However, such measures do not take full advantage of environmental cues to reduce power consumption.

In addition, while battery technologies have advanced rapidly in past years, the current rate of battery technology development is not keeping pace with the increasing capabilities and power drain of mobile devices. Thus, although techniques such as those mentioned above have been useful in somewhat increasing mobile device battery life, device operational lifetimes continue to be fairly limited, and better mobile device power management techniques are required to further reduce battery consumption and increase device operational lifetimes.

SUMMARY OF THE INVENTION

To address the deficiencies in existing mobile device power systems and techniques, an improved system and method of mobile device power consumption minimization are disclosed. In an embodiment of the invention, a mobile device supports a plurality of behavior modification techniques that can cooperate to collectively reduce the instantaneous power consumption of the device. Sensors located at, on, or within the device are used to establish a set of context conditions for the device, which context conditions are then used to selectively establish the state of each of the plurality of behavior modification techniques. In a further embodiment, the sensors detect and yield an output relating to the device's motion, tilt, proximity to a user, contact with a user, and orientation with respect to a user. In a further embodiment, the sensors detect the temperature of an ambient mass such as ambient air, or the temperature of a contacting body such as a hand or table.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention and its advantages may be best understood from the following detailed description taken in conjunction with the accompanying drawings, of which:

DETAILED DESCRIPTION OF THE INVENTION

The invention relates to a method and system for reducing power consumption in a mobile device through the use of sensors. In particular, an array of sensors are provided on a device, and their combined outputs are used to affect the power consumption of the device. In this manner, much longer device operational lifetimes may be achieved without a decrease in device usability.

Figure 1:
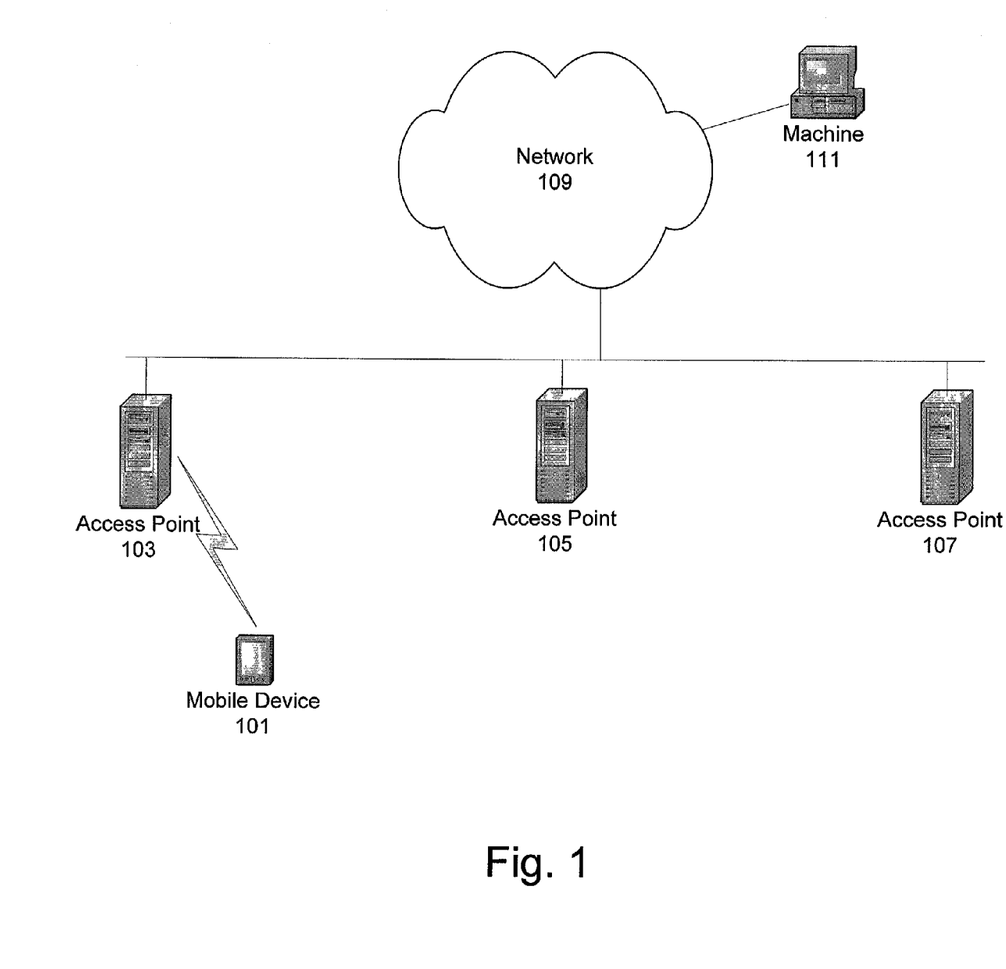
FIG. 1 is a schematic diagram of an exemplary computer network environment including a mobile computing device, within which embodiments of the invention may be implemented.

Referring to FIG. 1, a basic network topology is shown within which a mobile device may be used according to an embodiment of the invention. Typically, a mobile device 101 is transiently connected to a closest access point 103 of a plurality of access points 103, 105, 107. The access points 103, 105, 107 serve to interface the mobile device 101 to an infrastructure 109 such as a network. The access points may be for example wireless network access points such as according to the IEEE 802.11 standard for mobile computers and other devices, or cell phone cell transceivers where the mobile device 101 is a cell phone. The reason for providing a number of access points is that the range of the wireless medium, typically a radio frequency communication channel, is spatially limited, while the user is spatially unconstrained and may move about, hence moving into or out of range with respect to a particular access point. The underlying infrastructure 109 is typically predominantly not mobile, and may be a telephone infrastructure such as is typically interfaced to a cell transceiver, or other network such as a corporate LAN or the Internet interfaced to a wireless access point.

When a mobile device 101 communicates information to an access point 103, the purpose is generally to communicate with another device 111, mobile or otherwise, also interfaced to, or part of, the infrastructure 109. The other device 111 may be another similar device such as a computer, cell phone, or hand held information device used by another user, or may be a different type of device such as a server. The latter case includes but is not limited to the situation where a mobile device registers with a server within the infrastructure 109.

Generally, the mobile device 101 initially establishes a connection with the closest access point 103, and periodically thereafter informs the access point 103 of its continued presence while the device 101 remains within radio range. As the device 101 is moved out of radio range of one access point 103 and into radio range of another access point 105, the connection process may be repeated with respect to the new access point 105, while the connection to the old access point 103 times out or is explicitly ended. When the device 101 is out of radio range of any access point 103, 105, 107, the device 101 is no longer able to interface with the infrastructure 109. In such a case it will still typically be usable for functions that do not require any information beyond what is stored on the device itself. For example, if the device 101 is a mobile computer or personal information device, it will still be usable for any functions that do not require communication to the infrastructure 109.

Figure 2:
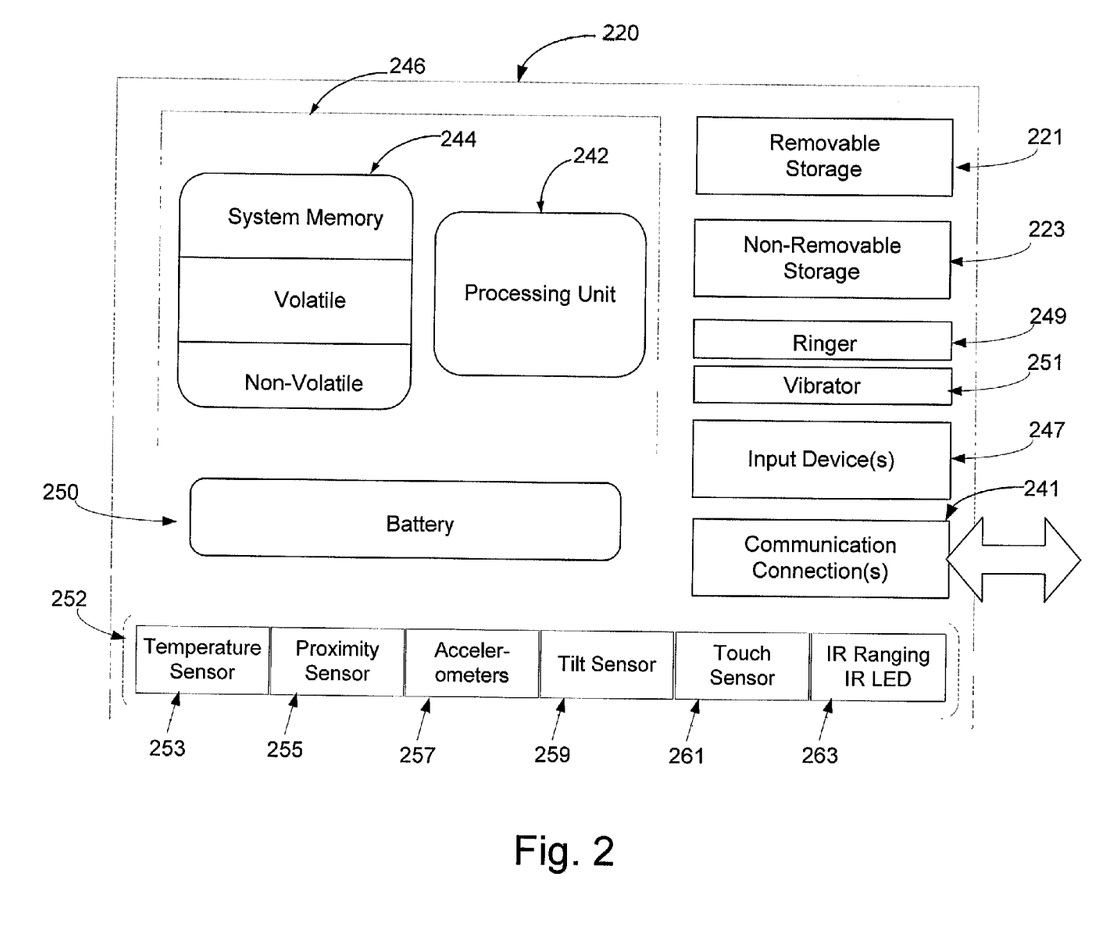
FIG. 2 is a schematic diagram illustrating the architecture of an exemplary mobile computing device according to an embodiment of the invention.

Referring to FIG. 2, an example of a basic configuration for a computing device, such as device 101, on which the system described herein may be implemented is shown. In its most basic configuration, the computing device 220 typically includes at least one processing unit 242 and memory 244 although such is not required. Depending on the exact configuration and type of the computing device 220, the memory 244 may be volatile (such as RAM), non-volatile (such as ROM or flash memory) or some combination of the two. This most basic general configuration is illustrated in FIG. 2 by dashed line 246. Additionally, the computing device may also have other features/functionality. For example, device 220 may also include additional removable data storage components 221 and/or non-removable data storage components 223 including, but not limited to, magnetic or optical disks or tape. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the computing device 220. Any such computer storage media may be part of the computing device 220.

The computing device 220 also preferably contains communication connections 248 that allow the device to communicate with other devices. Such communications connections preferably include an interface, such as a network interface card (NIC) to a wireless device such as another device similar to device 220 or a wireless access point to a network or infrastructure. A communication connection is an example of a communication medium. Communication media typically embodies readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

A computing device 220 may also have input devices 247 such as a keyboard, mouse, pen, voice input device, touch input device, etc. Preferably output devices such as a ringer 249 and/or vibrator 251 are also included when appropriate, such as for a cell phone or paging device. Furthermore, for wireless mobile devices, the computing device 220 is preferably provided with a portable power source 250, such as a battery pack, fuel cell or other power module. The power source 250 acts as a primary source of power for computations and wireless data transmissions to be performed by the device. The device may support a standby mode of operation wherein the device 220 consumes less power than in an ordinary mode of operation, perhaps at the expense of increased response time with respect to incoming communications, decreased bandwidth, and/or decreased radio range.

Device 220 also embodies a sensor array 252 including a plurality of sensors to detect and convey the context of the device 220 for power reduction as described more fully hereinafter. Exemplary sensors include a temperature sensor 253, a proximity sensor 255, one or more accelerometers 257, a tilt sensor 259, a touch sensor 261, and an IR ranging sensor 263 such as using an IR LED. Each sensor yields an output indicative of the sensed quantity or quality. Exemplary sensor details will be discussed below, although the invention is not limited to the sensors shown or the features described with respect to each sensor.

The temperature sensor 253 is preferably disposed so as to measure the temperature of the device 220 at a location on the surface of the device 220. Ideally, the temperature sensor 253 is mounted so that it will contact a user's hand when the device 220 is held in a typical location for use. In this manner, the temperature sensor 253 will indicate a different temperature when the device 220 is held by a user than when the device is not held, such as when it is on a table, etc. The temperature sensor 253 also preferably reacts to the ambient environmental temperature through convection and/or radiative heating effects when heating via a user's touch is not predominant. Any of the commercially available temperature sensors may be utilized for the temperature sensor 253.

The proximity sensor 255 is preferably a capacitive device that detects the proximity of a user within a fairly close range such as less than 0.5 meters. In an embodiment of the invention, the proximity sensor 255 is a single-plate capacitive device that detects a change in capacitance with respect to the plate caused by the nearness of a body such as a user. In an alternative embodiment, the proximity sensor 255 is a two-plate capacitive device, which is typically capable of detecting a body at a greater distance than a similar single-plate device. Generally, capacitive sensors detect change in capacitance by observing the decay characteristics of a circuit that includes the capacitive element, such as a plate, and any parasitic capacitance such as caused by a nearby individual. In particular, in one mechanism, the capacitive plate is pulsed by an output pin which pin is then used as an input to observe the plate voltage decay rate. Higher capacitance will generally lead to a detectably slower voltage decay rate.

The accelerometers 257 preferably comprise a grouping of linear accelerometers for detecting movement of the device 220 in any direction. Typically, this will require the use of three accelerometers, one for each axis of potential movement. Alternatively, the accelerometer group 257 may comprise a triaxial accelerometer, or one or more biaxial accelerometers. The accelerometers 257 may be of any type, including mass/spring, such as the ADXL50 produced by ANALOG DEVICES, or the ADXL105, ADXL202, and ADXL210 also produced by ANALOG DEVICES, or any other type. The accelerometers 257 yield an indication of when and to what degree the device accelerates along any axis. Alternatively, the accelerometers 257 may yield an indication of acceleration only along one or two axes.

The tilt sensor 259 comprises any device capable of sensing a tilting of the device 220 either via tilt angle measurement or angular acceleration measurement, or otherwise. The tilt sensor 259 yields an output indicative of the amount of tilt experienced by the device 220, or yields an output from which can be derived the same information. The tilt sensor preferably detects an absolute amount of tilt from a horizontal position in one or more axes of the device 220, but may alternatively detect a relative amount of tilt, referenced only to a prior position. Note that an accelerometer may be used as a component of the tilt sensor in one embodiment. This is especially true of accelerometers that can measure static acceleration such as the aforementioned devices produced by ANALOG DEVICES. A mass/spring accelerometer detects displacement of a mass, which can occur due to either dynamic acceleration, such as caused by a sudden displacement, or static acceleration, such as caused by gravity when the mass translation axis is tilted from horizontal.

The touch sensor 261 provides similar information to that provided by the proximity sensor but is much more limited in range. Thus, the touch sensor 261 detects and yields an output indicative of a condition wherein a user's hand or other part of their body is either in contact with the device 220 or is substantially in contact with the device 220, such as through a glove. The touch sensor is preferably a capacitive device such as those described above with respect to the proximity sensor 255, adapted to provide the required short range. Alternatively, the touch sensor comprises a pressure sensitive element that senses direct contact without necessarily sensing other degrees of proximity. Such pressure sensitive element may be either a micro switch, or a solid state device such as a strain gauge, or otherwise, without limitation. The touch sensor 261 can also be distributed in two or more noncontiguous regions on the device 220. For example, the touch sensor 261 may comprise two or more separate elements operating on the same or different principles of operation.

Finally, the IR ranging sensor 263 is disposed so as to detect the presence in front of the device 220 of a body such as an operator. Preferably the IR ranging sensor 263 comprises an IR light emitting diode (LED), operable to send from the front of the device 220 a coded beam of IR radiation, the reflection of which can be detected and processed to determine the presence and approximate distance in front of the device 220 of an operator or other body. In particular, the IR ranging sensor 263 preferably transmits a beam of IR radiation having a known data content. Subsequently, an IR detector associated with the IR ranging sensor 263 detects any return reflection of the transmitted beam. The data content of the return reflection, if any, is compared to the known data content of the transmitted beam, and a measure of the errors between the two is generated. The degree of error is then used to give an approximate range estimation of the distance between the device 220 and the reflecting body. For example, at very close ranges, such as 6 cm or less, the error rate between the transmitted and reflected beam may be almost zero, whereas at greater distances such as 60 cm, the error rate may exceed 50%. One alternative technique is to alter the duty cycle of a transmitted pulse train, and detect the threshold duty cycle at which a detectable reflection occurs, from which information an approximate range to the reflecting body may be derived.

While the aforementioned techniques can be used to approximate a range, it will be understood that these technique are not exact and may, for example, be significantly affected by the color and reflectance of the detected body. If higher accuracy is required in a specific implementation of the invention, then a more accurate range detector will preferably be employed. In any case, a different range detection technique or device may be utilized without departing from the scope of the invention.

Note that collection of information from the sensors may be performed according to any one or more standard techniques. For example, the sensor outputs may be periodically polled, the sensors may trigger an event periodically when output information changes, or the sensor outputs may be written to a common area of memory to be gathered at a later time. Those of skill in the art will appreciate that there are a number of other techniques that may be used additionally or alternatively to gather sensor output information, and the foregoing list is therefore exemplary rather than exhaustive.

The use of some or all of the aforementioned sensors or sensor groups to affect the power consumption of the device 220 will now be described by reference to FIGS. 3a–3d. There are a number of context variables that the aforementioned sensor array can detect and report. For example, the sensors can be used to determine whether a device is moving or not, whether the device is in the user's pocket or not, whether the device is close to the user or not, and whether the device is being looked at or not. The power consumption variables that can be controlled based on these context variables include at least the device's screen power, ring power, vibrator power, and radio power used during registration updating. If the device 220 supports a low power standby mode of operation, entry into and exit from this mode may also be controlled according to the context variable values.

Figure 3A:
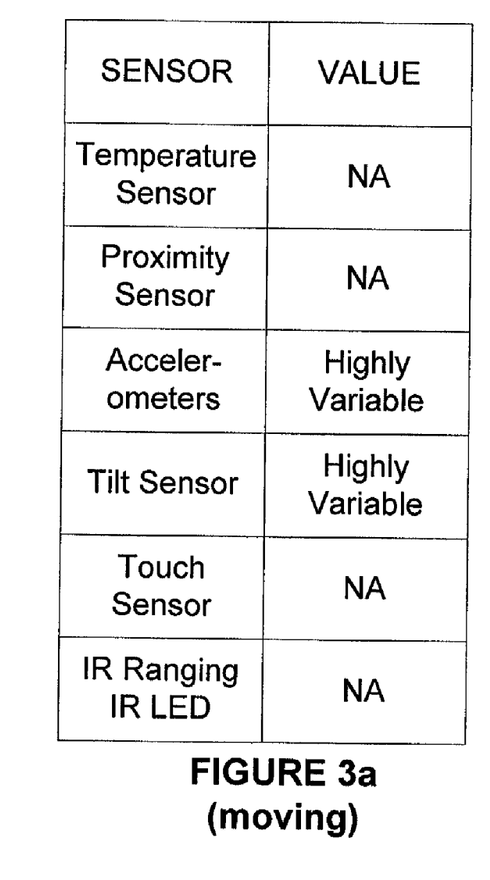
FIG. 3A is a table illustrating a configuration of sensor outputs usable in an embodiment of the invention to determine whether a mobile computing device is moving.

Each of FIGS. 3a–3d describes a set of context variable values that leads to one or more conclusions regarding device context and hence regarding device power savings steps to be taken. Note that the context conditions described with respect to the figures are not necessarily mutually exclusive. For example, a person may be walking with the device 220 and may also have the device 220 in his or her pocket. FIG. 3a shows the likely context variable values read when the device 220 is being moved, or transported, by the user walking. In this case, most of the sensor readings will be indeterminate, and hence not useful in determining whether the user is walking with the device 220 or not. These variables are marked with "NA" in the figure.

However, the accelerometers 257 will likely show a highly variable output when the user is walking with the device 220. In addition, depending upon the technology used to implement the tilt sensor 259, this sensor may also show increased activity with high variability while the user is walking with the device 220. The reaction of the accelerometers 257 and potentially the tilt sensor 259 is due to the fact that the motion used in walking subjects the device 220 to semi-periodic shock acceleration loads, such as when a foot strikes the floor, as well as semi-periodic translational acceleration loads such as when the user swings his hand with the device 220 in it, or when the user moves forward after a foot fall. In addition, there are a number of other acceleration loads, periodic or otherwise, that the device 220 may be subjected to while the user walks.

Figure 3B:
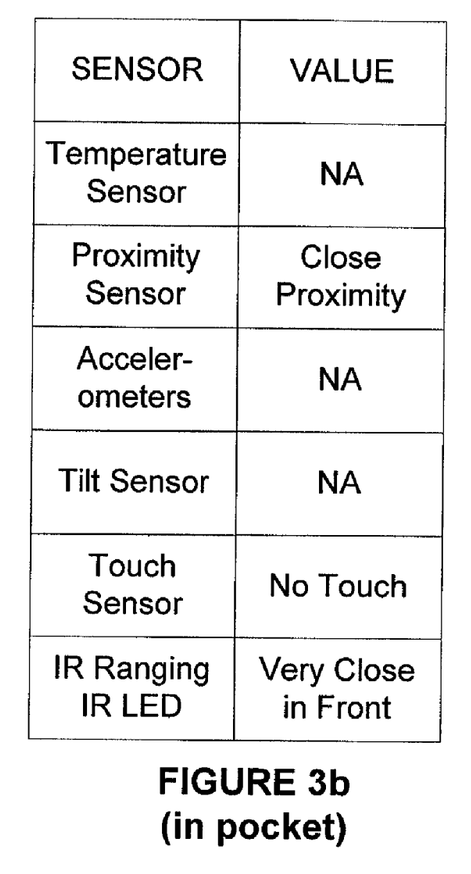
FIG. 3B is a table illustrating a configuration of sensor outputs usable in an embodiment of the invention to determine whether a mobile computing device is in a pocket.

FIG. 3b shows the likely context variable values read when a user has the device 220 in his or her pocket. As can be seen, many of the sensor readings will be indeterminate with respect to whether the user has the device 220 in his or her pocket, and these variables are thus marked with "NA" in the figure. Three of the sensors will, however, likely have a distinct reaction when the user has the device 220 in a pocket. In particular, the proximity sensor 255 will likely give a reading indicating a close proximity, since the user will most likely be quite close on the opposite side of the pocket material. Note that the touch sensor 261, which reacts only to much closer contact, preferably will not react when the device 220 is in a pocket, and will thus indicate no touch occurring. In addition, the IR ranging sensor 263 will experience great reflectivity due to the closeness of the pocket material, and will hence likely yield a reading indicative of an adjacent body at very close range.

Figure 3C:
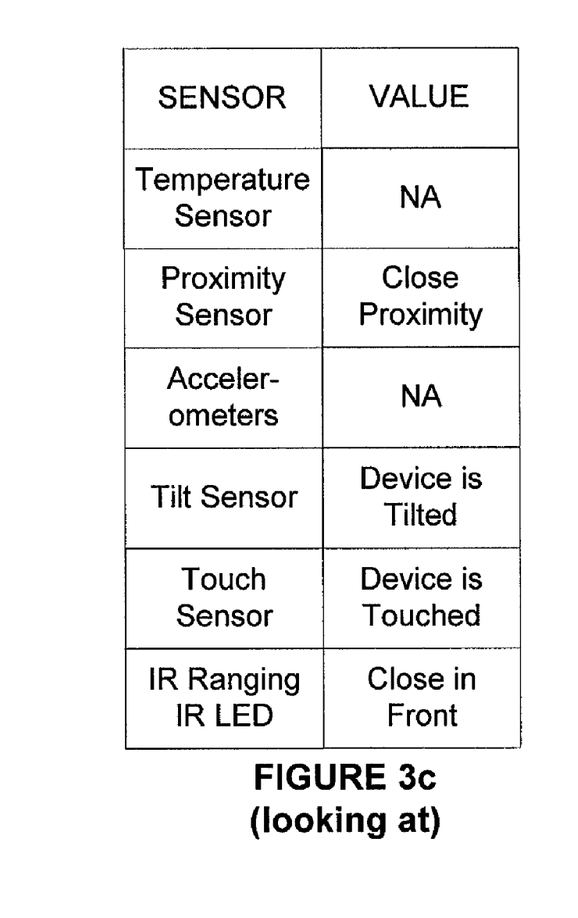
FIG. 3C is a table illustrating a configuration of sensor outputs usable in an embodiment of the invention to determine whether a mobile computing device is being looked at by a user.

FIG. 3c shows the likely context variable values read when a user is looking at the screen of the device 220. In particular, the proximity sensor 255 should yield a reading indicative of high proximity if the user is close enough to observe the screen of the device 220. Typically, a user will view a screen from a distance of approximately 24 cm, corresponding roughly to the relaxed focus point of the human eye. In addition, for many devices optimized for hand held operation, the user will naturally tilt the device 220 toward themselves, and thus the tilt sensor 259 for the device 220 will yield an output indicative of a substantial tilt such as 45 degrees from horizontal. As well, for devices optimized for hand held operation the user will generally be gripping the device 220 during viewing, and hence the touch sensor 261 will typically yield an output indicating that the device 220 is being touched when the user is looking at the screen of the device 220. Finally, since the user will typically look at the screen of the device 220 from a position in front of the device 220, and at a fairly close range, generally less that 1 meter, the IR ranging sensor 263 should yield a reading indicative of a body at close range in front of the device 220.

Figure 3D:
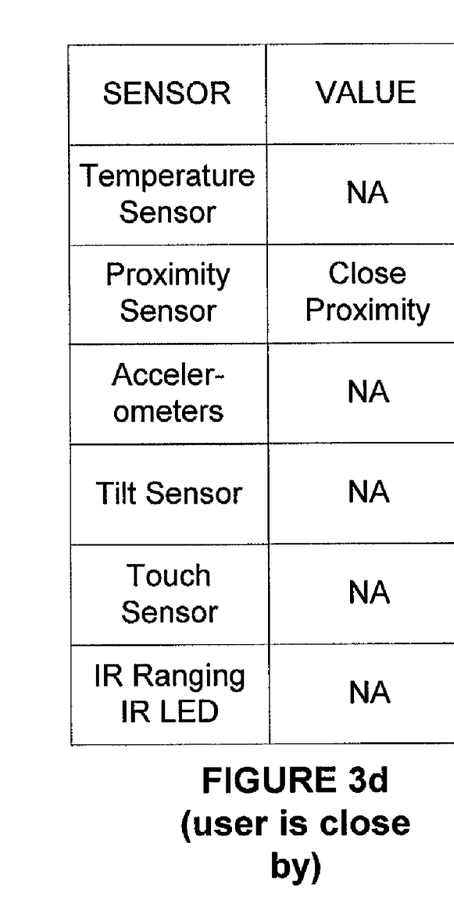
FIG. 3D is a table illustrating a configuration of sensor outputs usable in an embodiment of the invention to determine whether a mobile computing device is close to a user.

FIG. 3d shows the likely context variable values read when a user is simply close to the device 220. In particular, the proximity sensor 255 will detect the presence of the user within a certain range of the device as discussed above. Thus, in the situation where the user is close to the device 220 (such as close enough to hear a ringer of reduced, or lower than normal ring volume) the proximity sensor 255 should yield an output so indicating. The touch sensor 261 and IR ranging sensor 263 may also give a reading indicating touch and/or proximity in front of the device 220 respectively, but such need not be the case. For example, the user may have the device 220 resting untouched and face down on a nearby table.

Note that the temperature sensor reading is not explicitly used in the determinations of FIGS. 3A–D, but may be used to help make a determination in certain ambiguous cases. For example, many readings will be the same whether the device 220 is in a backpack on the user's back or in a user's pocket. However, the temperature sensor will probably detect a colder temperature when the device 220 is in the backpack because it will be more insulated from the user's body heat. In contrast, the temperature reading while in the user's pocket will be higher, and may approach body temperature in some cases. Other ambiguous cases may also be solved by use of the temperature sensor output. For example, a sudden change in temperature may be used to indicate exit from or entry to a building. In the case of entry to a building, the normal settings for a moving device may apply, but in the case of leaving a building, it may be assumed that access points will be fewer and further between, and hence the registration frequency may be decreased over what it may otherwise be for a device in otherwise similar circumstances. Given the described architecture, those of skill in the art will appreciate the myriad of other uses to which the temperature sensor may be put.

Figure 4:
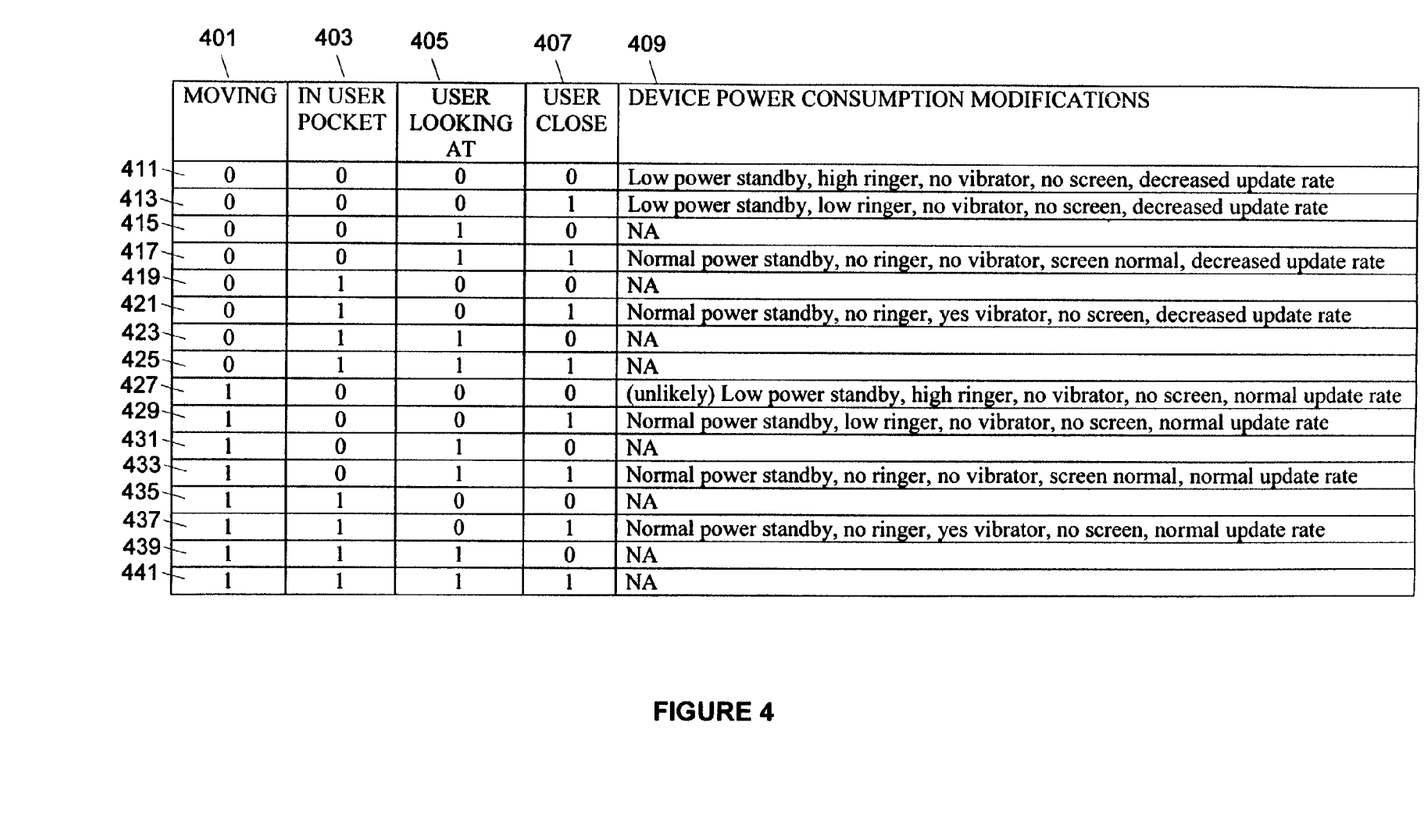
FIG. 4 is a flow chart illustrating a process for applying context information to affect the behavior of a mobile computing device according to an embodiment of the invention.

The determination of whether a device 220 is moving, is in a pocket, is being looked at, and/or is close to a user can be used to modify the power consumption of the device 220, as will be discussed hereinafter with reference to FIG. 4. FIG. 4 gives a table linking observed device contextual properties to modifications in device power consumption. In particular, columns 401, 403, 405, and 407 describe the state of a context variable, while column 409 describes the resultant power consumption modification techniques applicable given a particular set of context variable values.

Beginning with row 411, it can be seen that the device 220 is not moving, is not in the user's pocket, is not being looked at (at the screen), and is not close to the user. This set of context variable values generally corresponds to the situation where the device 220 has been set down somewhere, perhaps in the same room as the user, but not very close to the user. In this situation, as described in row 411 it is assumed that the device is not being actively used, at least for outgoing communications, and hence the device is placed in a low power standby mode, such as via a mode of its primary wireless channel or via a secondary low power channel. In addition, the ringer is set to high power so that the user has a higher probability of hearing it if and when it is used, and the vibrator is deactivated so that it will not actuate upon an incoming communication, since the user is not close enough to feel any vibration. Further, the screen is darkened since the user is not close enough to use it, and the frequency of registration updates to a wireless access point is set at a decreased rate since the device is not moving, making a change in registration unlikely.

With reference to row 413, it can be seen that the device 220 is not moving, is not in the user's pocket, is not being looked at (at the screen), and is close to the user. This set of context variable values generally corresponds to the same situation described by row 411, except that the user is now closer to the device 220. In this case, the power consumption behavior of the device is changed from that described in row 411 by setting the ringer to a lower volume setting, since the user is now closer to the device 220, and should be able to hear a lower volume ringer than when the user is further from the device 220.

Row 415 describes a combination of context variables that is unlikely to occur absent a malfunction of one or more sensors. In particular, row 415 describes a situation wherein the user is looking at the screen but is not close to the device 220. As with row 415, the context variable values represented in row 419 are unlikely to occur absent a sensor failure. In particular, it is unlikely that the device 220 would be in the user's pocket while not being close to the user. Similarly, rows 423 (in pocket and being looked at), 425 (same inconsistency as row 423), 431 (same inconsistency as row 415), 435 (same inconsistency as row 415), 439 (same inconsistencies as rows 423 and 419), and 441 (same inconsistency as row 423) describe unlikely combinations of context variable values, and would most likely represent a sensor failure. Thus, when the context variable value combinations in any of rows 415, 419, 423, 425, 431, 435, 439, and 441 occur, a visual or audible signal is preferably conveyed to the user to indicate probable sensor failure. Alternatively or additionally, the device 220 may enter a default mode of operation, such as the mode described with respect to row 411.

The situation described by the context variable values presented in row 417 most likely corresponds to a user standing still, holding the device 220, while looking at the device screen. In such a situation, the device 220 is preferably placed in a normal mode ready to send and receive on the assumption that the user will imminently send or receive information at that point. Preferably, the screen is set to a normal display value rather than being darkened or dimmed, and the ringer and vibrator are deactivated since the user will likely detect any incoming call simply by watching the device screen. Since the user is not moving, the frequency of registration updates to a wireless access point is set at a decreased rate.

With reference to row 421, it can be seen that the device 220 is not moving, is in the user's pocket, is not being looked, and is close to the user. This set of context variable values generally corresponds to the situation where the device 220 is in the pocket of a user who is standing relatively still. In this case, the power consumption affecting properties of the device are modified so that the device is in a normal mode of operation, as opposed to low power standby, the ringer is deactivated and the vibrator activated, the screen is darkened (i.e. no power to the screen), and the frequency of registration updates is set to a decreased value.

With reference to row 427, it can be seen that the device 220 is moving, is not in the user's pocket, is not being looked at (at the screen), and is not close to the user. This set of context variable values is generally unlikely to occur, and could correspond to a situation where the device 220 had been placed down on a movable object such as an audio visual support cart. If this situation were to occur, the power consumption behaviors described with respect to row 411 would be appropriate, with the exception that the registration update frequency should be at a normal rate since the device 220 is moving.

The context variable value combination described in row 429 will generally occur when the user is holding the device 220 and walking with it, without placing it in a pocket and without observing the screen. In this situation, the device 220 is preferably placed in a normal power mode due to likely imminent use, the ringer is set to a lower volume, the vibrator is deactivated, the screen is darkened, and the registration update rate is set to a normal rate as opposed to a decreased rate due to the fact that the device 220 is moving.

With reference to row 433, it can be seen that the device 220 is moving, is not in the user's pocket, is being looked at, and is close to the user. This set of context variable values generally corresponds to the situation where the user is holding the device 220 and walking with it, while observing the screen. In this case, it is preferable that the power consumption characteristics be set as in row 417, with the exception that the update rate should be set to normal rather than decreased since the device 220 is moving.

Finally, the context variable value combination represented in row 437 corresponds to a situation where the user is walking with the device 220 in a pocket. In this situation, the power consumption characteristics should be set as in row 421, except that the update rate should be set to normal rather than decreased since the device 220 is moving. In particular, the device 220 should be in a normal rather than low power stand by mode, should have the ringer deactivated, the vibrator activated, the screen darkened, and the registration update frequency set to normal rather than decreased.

Information such as that corresponding to the table of FIG. 4 is preferably stored electronically in a table or other data structure within the memory of the device 220. The exact format or content of the information so stored is not critical, but it preferably describes sets of power consumption variable responses linked to various context variable value sets, so that the power consumption of the device 220 is decreased on average by modifying the behavior of the device according to the table in response to the presence of certain context variable values.

Also note that the foregoing description of linking sensed values to types of environmental conditions and ultimately to a listing of power consumption variable settings is given for the convenience of the reader and is not exhaustive. For example, sensed value sets may be linked directly to listings of power consumption variable settings. Additionally, it is not required that the linkage between sensed values and listings of power consumption variable settings be performed via a tabulated mapping. For example, the linkage may be made by way of a formula or set of formulae, whereby entry of the relevant sensed values or derived environmental context conclusions yields an appropriate group of power consumption variable settings. Thus it will be appreciated that the given illustration is exemplary rather than exhaustive.

Although the examples herein focus on specific power consumption variables to be modified in response to measured context variable value combinations, other power consumption variables and context variables or values thereof may be used alternatively or additionally without limitation. Furthermore, the specific responses shown as responsive to certain context variable value combinations are exemplary, rather than limitative. As such, any other response of the same or other power consumption variables may be used to reduce the power consumption of a device without departing from the scope of the invention.

It will appreciated that a novel power management technique and system have been disclosed for reducing power consumption in mobile devices communicably linked to one or more other machines or devices by controlling a plurality of power affecting behaviors. In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. A low power wireless device comprising:
   a screen for displaying information to a user;
   a ringer for audibly apprising the user of an incoming communication;
   a vibrator for providing the user with a tactile prompt apprising the user of an incoming communication;
   a network interface for interfacing the device to a wireless transceiver; and
   a sensor array comprised of a plurality of sensors for sensing a plurality of qualities of an environment of the device and for yielding an output related thereto, wherein the sensor array output is utilized to affect the operation of at least one of the screen, the ringer, the vibrator, and the network interface, wherein when the sensor array output indicates that a user is looking at the device screen, the operation of the ringer and vibrator are affected so that in response to notification of an incoming communication received at the wireless interface, the ringer provides no audible signal, and the vibrator is not activated, and the operation of the screen is affected so that it does receive power.

2. The device according to claim 1, wherein the screen receiving power causes the screen to display a visual notification of the incoming communication.

* * * * *